United States Patent
Sheng et al.

(10) Patent No.: US 9,247,438 B2
(45) Date of Patent: Jan. 26, 2016

(54) SEARCH METHOD FOR WIRELESS COMMUNICATION SYSTEM

(71) Applicant: MStar Semiconductor, Inc., Hsinchu Hsien (TW)

(72) Inventors: Li-Wei Sheng, Irvine, CA (US); Ying-Chieh Chiang, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 395 days.

(21) Appl. No.: 13/785,204

(22) Filed: Mar. 5, 2013

(65) Prior Publication Data

US 2014/0045431 A1 Feb. 13, 2014

(30) Foreign Application Priority Data

Aug. 10, 2012 (TW) .............................. 101129055 A

(51) Int. Cl.
*H04W 24/00* (2009.01)
*H04W 24/02* (2009.01)
*G06K 19/00* (2006.01)

(52) U.S. Cl.
CPC ............... *H04W 24/02* (2013.01); *G06K 19/00* (2013.01); *G06F 2221/2111* (2013.01)

(58) Field of Classification Search
CPC . H04L 27/3863; H04L 27/3872; G01S 19/22; G01S 7/52077; G01R 27/02
USPC ............. 455/63.1, 67.16, 67.11, 70, 71, 41.1, 455/41.2; 340/10.1; 375/150, 147
See application file for complete search history.

(56) References Cited

U.S. PATENT DOCUMENTS

| | | | | |
|---|---|---|---|---|
| 8,265,570 B2* | 9/2012 | Koo | ..................... | G06K 7/0008 340/10.1 |
| 8,391,785 B2* | 3/2013 | Hyde | ................. | G06K 19/0707 455/41.1 |
| 9,031,504 B1* | 5/2015 | Hyde | ................. | G06K 19/0707 455/41.1 |
| 2009/0130977 A1* | 5/2009 | Grushkevich | ....... | H04W 72/082 455/41.2 |
| 2010/0004540 A1* | 1/2010 | Thiele | ...................... | A61B 8/08 600/447 |
| 2010/0208775 A1* | 8/2010 | Weill | ...................... | G01S 19/37 375/150 |
| 2012/0099607 A1* | 4/2012 | Cariou | .................. | H04L 27/261 370/478 |
| 2013/0201003 A1* | 8/2013 | Sabesan | .................... | G01S 7/42 340/10.1 |
| 2014/0201203 A1* | 7/2014 | Krishna | ............ | G06F 17/30528 707/729 |

\* cited by examiner

*Primary Examiner* — Edward Urban
*Assistant Examiner* — Max Mathew
(74) *Attorney, Agent, or Firm* — Edell, Shapiro & Finnan, LLC

(57) ABSTRACT

A searching method for finding a target location in a variable space is provided. The variable space is constructed by a set of variables and has multiple sub-spaces. The target location renders an output result of a wireless communication system to satisfy a target value. The search method includes steps of: providing the set of variables; identifying a target sub-space where the target location is located from the sub-spaces; obtaining a plurality of gradients of the output result at a predetermined location from the target sub-space, each of the gradients corresponding to a direction of change; and selecting one from the directions of change according to the gradients, and changing values of the set of variables according to the selected direction of change to find the target location.

19 Claims, 6 Drawing Sheets

SEARCH METHOD FOR WIRELESS COMMUNICATION SYSTEM

This application claims the benefit of Taiwan application Serial No. 101129055, filed Aug. 10, 2012, the subject matter of which is incorporated herein by reference.

BACKGROUND OF THE INVENTION

1. Field of the Invention

The invention relates in general to a search method for a wireless communication system, and more particularly to a search method for finding a target location in a variable space so that an output result of a wireless communication system satisfies a target value.

2. Description of the Related Art

A communication system frequently encounters optimization issues. For example, an image rejection mixer needs to adjust a size and a phase of a local signal to remove a signal of an image channel, i.e., to minimize signal energy of the image channel. In a radio-frequency identification (RFID) application, a carrier signal transmitted from a reader becomes noise due to reflection, and the noise may then be received by the reader. The energy of such noise also needs to be minimized.

To achieve optimization, a most appropriate value for a controllable variable is sought for in order to render a maximized or minimized output result. The search process may be accomplished through algorithms. For example, exhaustive search is a type of algorithm that tries all possible variable combinations of a variable once. According to all output results generated by the combinations, an optimal output result can be identified, and thus the most appropriate values for the variable can be obtained. However, as each of the variable combinations needs to be executed once, the exhaustive search process for finding the most appropriate variable values is not only extremely time-consuming but also involves an immense amount of computations. Therefore, the conventional exhaustive search is impractical for a communication system that demands high-speed and power-saving features.

SUMMARY OF THE INVENTION

The invention is directed to a search method for a wireless communication system for finding a target location in a variable space. The variable space is constructed by a set of variables and has a plurality of sub-spaces. The target location renders an output result of the communication system to satisfy a target value.

According to an aspect the present invention, a search method for finding a target space in a variable space is provided. The variable space is constructed by a set of variables and has a plurality of sub-spaces. The target space renders an output result of a wireless communication system to satisfy a target value. The search method includes steps of: providing the set of variables; identifying a target sub-space where the target location is located from the sub-spaces; obtaining a plurality of gradients of the output result at a predetermined location from the target sub-space, each of the gradients corresponding to a direction of change; and selecting one from the directions of change according to the gradients, and changing values of the set of variables along the selected direction of change to find the target location.

According to another aspect of the present invention, a search method for finding a target location in a variable space is provided. The variable space is constructed by a set of variables and has a plurality of sub-spaces. The target location renders an output result of a wireless communication system to satisfy a target value. The search result includes steps of: providing two quadrature compensation signals; providing the set of variables for controlling the compensation signals; feeding the compensation signals to an input of the wireless communication system to affect the output result of the wireless communication system; identifying a target sub-space where the target location is located from the sub-spaces; obtaining a plurality of gradients of the output result at a predetermined locations, each of the gradients corresponding to a direction of change; and selecting one from the directions of change according to the gradients, and changing values of the set of variables along the selected direction of change to find the target location.

The above and other aspects of the invention will become better understood with regard to the following detailed description of the preferred but non-limiting embodiments. The following description is made with reference to the accompanying drawings.

DETAILED DESCRIPTION OF THE INVENTION

Noise optimization for a radio-frequency identification (RFID) reader is utilized as an example in the embodiments for explaining the present invention. It should be noted that the present invention is not limited to applications of an RFID reader, but is also suitable for optimization of other applications in wireless communications. For example, based on the disclosed embodiments, a person having ordinary skill in the art may also implement the present invention for image rejection.

Figure 1:
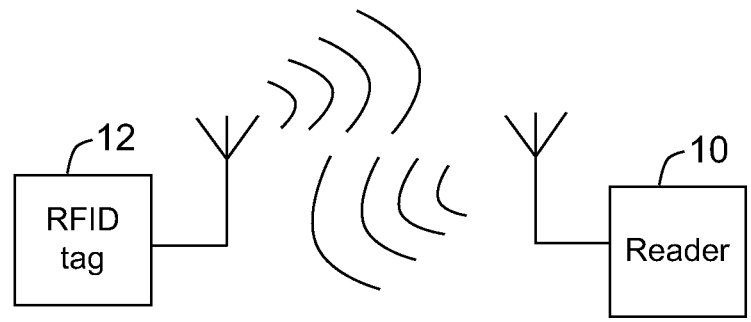
FIG. 1 shows a conventional radio-frequency identification (RFID) system.

Referring to FIG. 1, an RFID system generally requires a reader and an RFID tag. In an RFID operation, an RF electric wave is transmitted by the reader 10 to trigger the RFID tag 12 within coverage, and an electric current is generated through electromagnetic sensing to power a chip on the RFID tag 12 and to backscatter a wireless signal to the reader 10.

Figure 2:
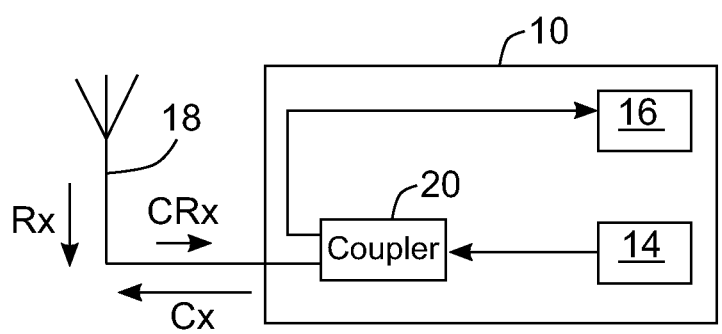
FIG. 2 depicts a structure in a reader in FIG. 1.

The RFID tag 12 usually transmits a message via a modulated carrier signal when backscattering to the reader 10. At this point, the reader 10 however still transmits unmodulated carrier signals for powering a passive tag. FIG. 2 shows a structure in the reader 10. A majority of a carrier signal Cx sent by the transmitter 14 is transmitted to the environment via an antenna 18. Due to slight impedance mismatch in real situations, a small part of the carrier signal Cx is reflected by the antenna 18, as indicated by a reflected carrier signal CRx in FIG. 2. The reflected carrier signal CRx and a wireless signal Rx received by the antenna 18 are jointly received by the receiver 16 via a coupler 20. Compared to the desired wireless signal Rx, the reflected carrier signal CRx is equivalently noise that should be restrained or eliminated. The presence of the reflected carrier signal CRx lowers a signal-to-noise ratio (SNR) of a receiving terminal of the receiver 16. Once the reflected carrier signal CRx is aggravated, the wireless signal Rx may be overwhelmed by the reflected carrier signal CRx and become unidentifiable. In an ideal approach, the reflected carrier signal CRx is totally eliminated or mitigated to be lower than a target value, so that the wireless signal Rx may remain identifiable and thus increasing the SNR.

Figure 3:
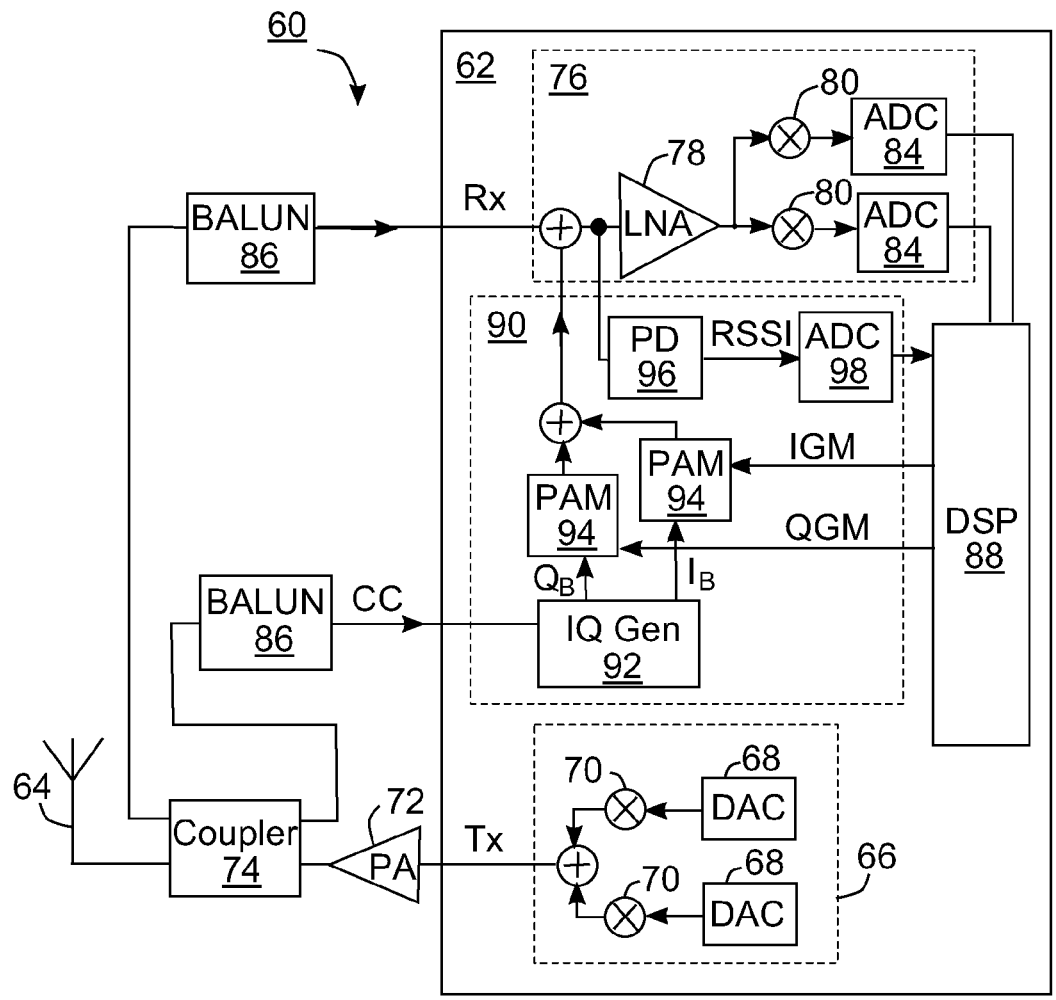
FIG. 3 is a block diagram of a transceiver applicable to an RFID system according to one embodiment of the present invention.

FIG. 3 shows a block diagram of an RFID transceiver. Referring to FIG. 3, a transceiver 60 includes a reader 62, an antenna 64, and several discrete elements.

A digital message to be transmitted by the reader 62 is converted by a digital-to-analog converter (DAC) 68 and up-converted by a mixer 70, and is transmitted to the environment via a transmitting terminal Tx of the transmitter 66, a power amplifier 72, a coupler 74 and the antenna 64. The mixer 70 mixes the modulated signal outputted by the DAC 68 and a carrier signal provided by a local oscillator.

A receiver 76 includes a low-noise amplifier (LNA) 78, a mixer 80 and an analog-to-digital converter (ADC) 84. The wireless signal transmitted by the RFID tag and received by the antenna 64 is processed by the coupler 74, a balanced and unbalanced converter (balun) 86 and a receiving terminal RX, and is then received by the receiver 76. After processes of down-conversion and analog-to-digital conversion, the receiver 76 provides a corresponding digital signal to a digital signal processor 88, which can be implemented in hardware, software or a combination thereof. For example, processor 88 may be in the form of an application specific integrated circuit (ASIC) that is encoded with logic instructions operable to perform the functions described herein.

As the transmitter 66 transmits the carrier signal Cx via the transmitting terminal TX, the power amplifier 72, a coupler 74 and the antenna 64, a part of the carrier signal Cx is reflected by the antenna 64 as the reflected carrier signal CRx. As far as wireless signals from the RFID tag are concerned, the reflected carrier signal CRx is noise that should be restrained or eliminated. Without appropriate processing, noise such as the reflected carrier signal CRx are included in the wireless signal, and are received by the receiver 76 via the coupler 74, the balun 86 and the receiving terminal RX.

The reader 62 further includes a noise canceller 90 for eliminating or restraining the noise (i.e., the reflected carrier signal CRx) included in the wireless signal received by the receiving terminal RX to increase the SNR. The noise canceller 90 includes a quadrature basic signal generator 92, programmable amplifiers 94, a power detector 96 and an ADC 98.

Figure 4:
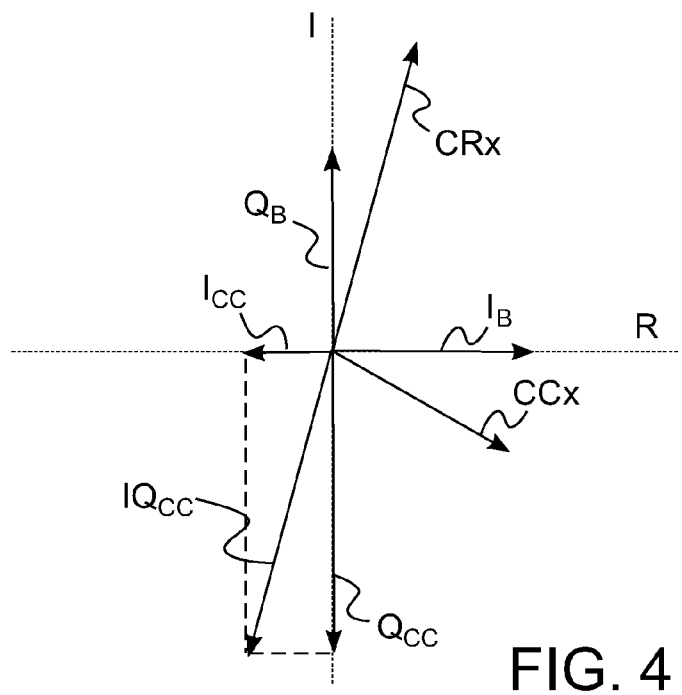
FIG. 4 is a relationship diagram between phases and signal strengths of associated signals in FIG. 3.

A part of the carrier signal Cx passes through the coupler 74 and a balun 100 to reach a carrier cancelling terminal CC, and becomes a carrier cancelling signal CCx. Since the carrier cancelling signal CCx and the reflected carrier signal CRx, both being a part of the carrier signal Cx, pass through different transmission paths, the carrier cancelling signal CCx and the reflected carrier signal CRx only differ in signal phase and signal strength. FIG. 4 shows exemplary relationships between phases and signal strengths of associated signal in FIG. 3. In FIG. 4, assume that the carrier cancelling signal CCx is located in the fourth quadrant, and the reflected carrier signal CRx is located in the first quadrant.

On basis of the carrier cancelling signal CCx, the quadrature basic signal generator 92 provides a quadrature basic signal pair ($I_B$, $Q_B$). Taking FIG. 4 for example, the quadrature basic signal generator 92 generates a basic signal pair ($I_B$, $Q_B$), which are respectively located at borders of the first quadrant in FIG. 4.

The two programmable amplifiers 94 linearly amplify the received basic signal pair ($I_B$, $Q_B$) according to amplification ratios $g_I$ and $g_Q$ determined by amplification ratio control signals IGM and QGM, respectively, into corresponding compensation signals $I_{CC}$ and $Q_{CC}$. The two compensation signals $I_{CC}$ and $Q_{CC}$ are consolidated into a feedback signal $IQ_{CC}$, which is then fed to the input of the receiver 76, i.e., the receiving terminal RX. The digital signal processor 88 provides amplification ratio control signals IGM and QGM for controlling the signal strength and polarity of the quadrature compensation signals $I_{CC}$ and $Q_{CC}$. Taking FIG. 3 for example, the programmable amplifiers 94 linearly convert the basic signal pair ($I_B$, $Q_B$) to the corresponding compensation signal pair ($I_{CC}$, $Q_{CC}$). The feedback signal $IQ_{CC}$ is a vector sum of the compensation signals $I_{CC}$ and $Q_{CC}$. The amplification ratio control signals IGM and QGM also in equivalence determine a length and an angle of the feedback signal $IQ_{CC}$ in FIG. 4. Given that the feedback signal $IQ_{CC}$ equals a reverse of the reflected carrier signal CRx, the feedback signal $IQ_{CC}$ may substantially cancel out the reflected carrier signal CRx to eliminate the noises.

A power detector 96 detects the signal strength of the noise in the wireless signal received by the receiving terminal RX, i.e., the strength of the reflected carrier signal CRx, to generate a received signal strength index (RSSI). According to the RSSI, the digital signal processor 88 updates the amplification ratio control signals IGM and QGM to accordingly adjust the feedback signal $IQ_{CC}$. For example, the digital signal processor 88 is built in with an optimization algorithm for identifying optimal amplification ratio control signals $IGM_{best}$ and $QGM_{best}$ for rendering a lowest possible RSSI. The digital signal processor 88 records the optimal amplification ratio control signals $IGM_{best}$ and $QGM_{best}$ for normal operations, so as to eliminate the reflected carrier signal CRx and to increase the SNR at the receiving terminal RX.

Figure 5:
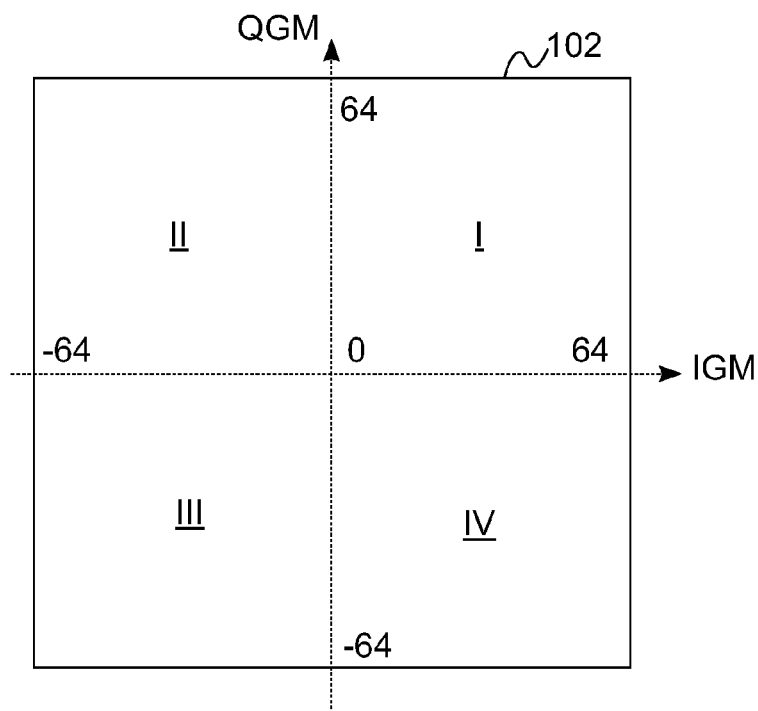
FIG. 5 is a variable space constructed by amplification ratio control signals IGM and QGM.

The amplification ratio control signals IGM and QGM are two controllable variables capable of affecting the RSSI that the digital signal controller 88 obtains. FIG. 5 shows a variable space constructed by the amplification ratio control signals IGM and QGM, with the horizontal axis representing IGM and the vertical axis representing QGM. In one embodiment of the present invention, each of the amplification ratio control signals IGM and QGM is an integer between 63 and −63. Thus, a variable space 102 is approximately a square in FIG. 5, and the amplification ratio control signal pair (IGM, QGM) corresponds to a current location in the variable space. Further, the most appropriate amplification ratio control signal pair ($IGM_{best}$, $QGM_{best}$) corresponds to an optimal location identified from the variable space 102, such that the RSSI is a minimum value. As shown in FIG. 5, the variable space 102 may be divided into four sub-spaces—a first quadrant I, a second quadrant II, a third quadrant III and a fourth quadrant IV.

In the description below, the amplification ratio control signal pair (IGM, QGM), the most appropriate amplification ratio control signal pair ($IGM_{best}$, $QGM_{best}$) and the optimal output result $RSSI_{best}$ are variables temporarily stored in the digital signal controller 88. The amplification ratio control signal pair (IGM, QGM) is referred to as a current location, the most appropriate amplification ratio control signal pair ($IGM_{best}$, $QGM_{best}$) is referred to as an optimal location, the RSSI (IGM, QGM) in the transceiver 60 resulted by the current location is referred to as a current output result, and the RSSI ($IGM_{best}$, $QGM_{best}$) resulted by the optimal location is referred to as the optimal output result $RSSI_{best}$. The optimal location and the optimal output result $RSSI_{best}$ are constantly modified in the process of the optimization algorithm step until the optimization algorithm step ends.

Figure 6:
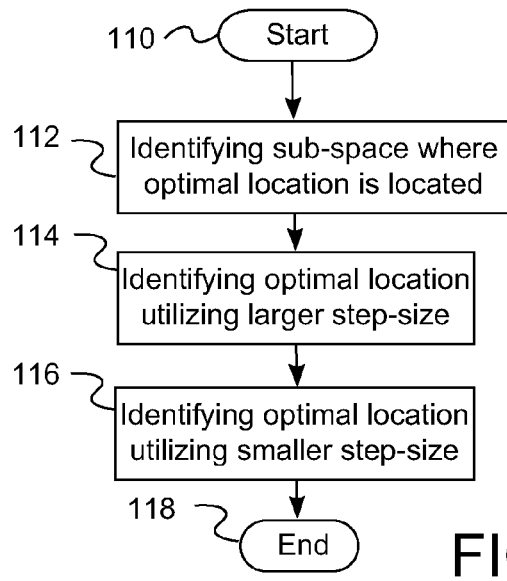
FIG. 6 is an exemplary optimal algorithm adopted by a digital signal controller in FIG. 3.

FIG. 6 shows a flowchart of an optimization algorithm process employed by the digital signal controller 88 in FIG. 3. The optimization algorithm process begins with step 110. In step 112, an optimal sub-space is identified from the four sub-spaces. That is, it is identified in which of the four sub-spaces the optimal location is located. In step 114, the amplification ratio control signal pair (IGM, QGM) is modified utilizing a large step-size to coarsely determine the optimal location in the optimal sub-space. In step 116, the amplification ratio control signal pair (IGM, QGM) is modified utilizing a small step-size to fine-tune the optimal location in a predetermined region near the optimal location. The optimization algorithm process ends with step 118.

Figure 7:
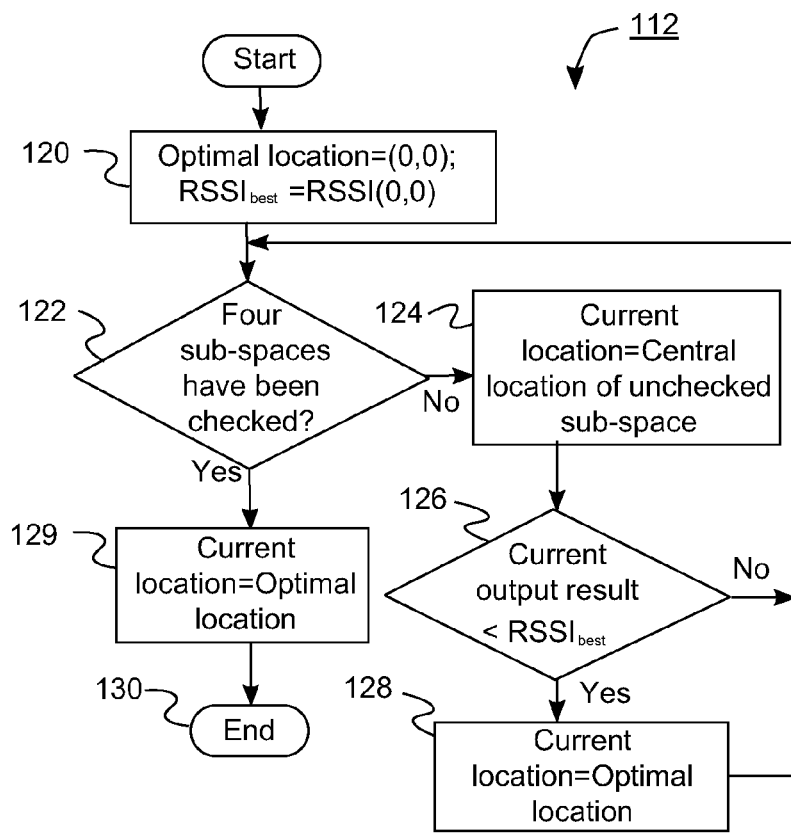
FIG. 7 is an example of step 112 of FIG. 6.

FIG. 7 shows an example of details of step 112. In Step 120, as a first step upon the start of step 112, the optimal location is predetermined as an origin in FIG. 5, i.e., (0, 0); the optimal output result $RSSI_{best}$ is predetermined as a current output result, i.e., RSSI (0, 0). When it is determined in step 122 that not all of the four sub-spaces are checked, step 124 is performed to relocate the current location to a central location of a sub-space that is not yet checked. Taking the first quadrant I in FIG. 5 for example, the central location is (32, 32). When it is determined in step 126 that the current output result is not better than the optimal output result $RSSI_{best}$, step 122 is performed to check another sub-space. When it is determined in step 126 that the current output result is better than the optimal output result $RSSI_{best}$, step 128 is performed to update the current location and the current output result as the optimal location and the optimal output result $RSSI_{best}$, respectively. The completion of step 128 is equivalently having checked all of the sub-spaces, and step 122 is iterated. Once it is determined in step 122 that all of the four sub-spaces are checked, step 129 is performed to set the optimal location as the current location, and step 130 is performed to end step 112.

Taking FIG. 5 as an example, when ending step 130 in FIG. 7, the optimal output result $RSSI_{best}$ is a minimum value among RSSI (32, 32), RSSI (−32, 32), RSSI (−32, −32) and RSSI (32, −32); the optimal location is the location corresponding to the minimum value. After going through five points of (0, 0), (32, 32), (−32, 32), (−32, −32) and (32, −32), the current location returns to the identified optimal location.

Figure 8:
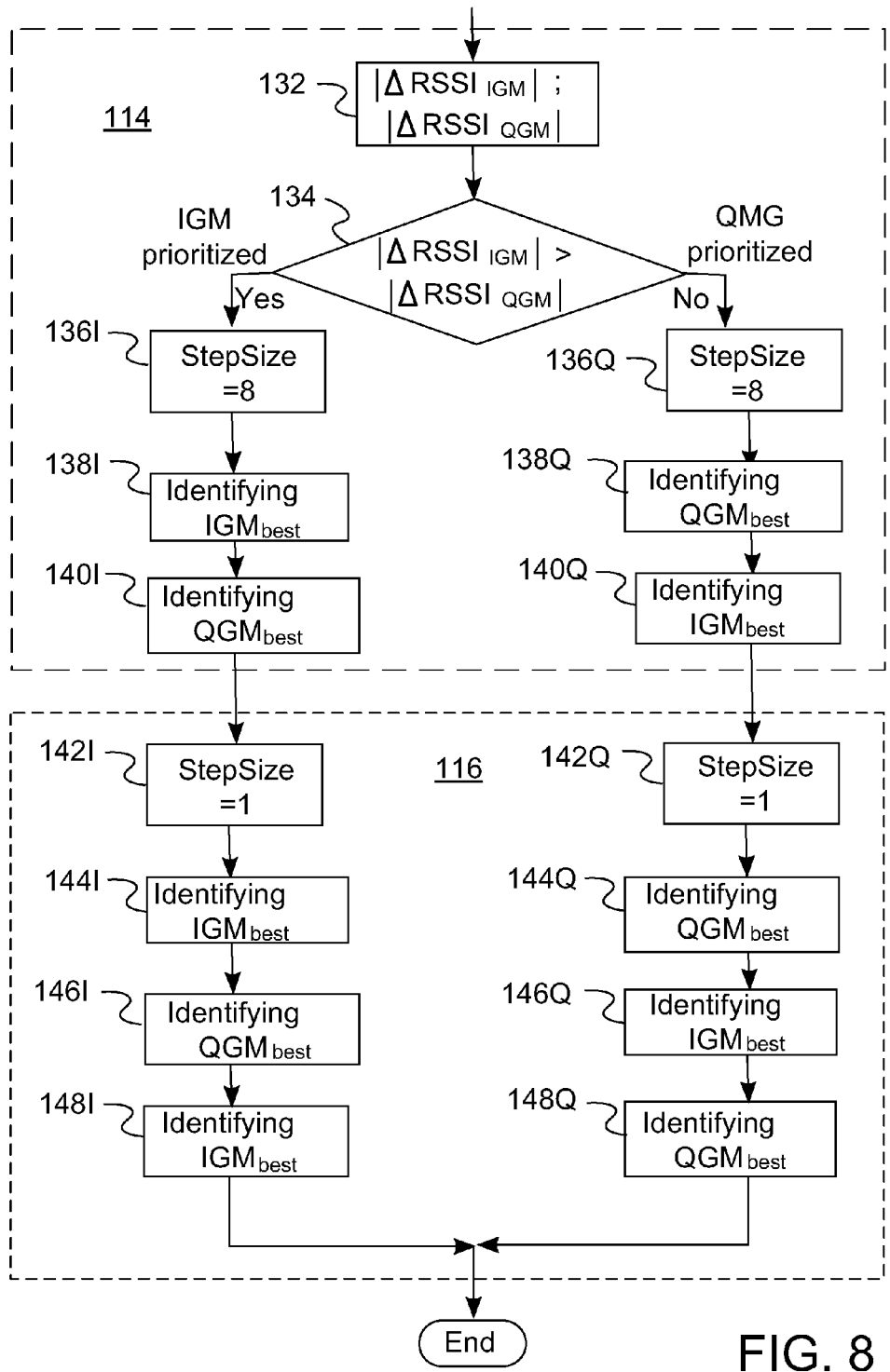
FIG. 8 is an example of steps 114 and 116 in FIG. 6.

FIG. 8 shows an example of details of steps 114 and 116 in FIG. 6. In step 132, two gradients $|\Delta RSSI_{IGM}|$ and $|\Delta RSSI_{QGM}|$ of the current location are calculated. The gradients $|\Delta RSSI_{IGM}|$ and $|\Delta RSSI_{QGM}|$ respectively correspond to the horizontal axis (IGM) and the vertical axis (QGM), where $\|$ represents an absolute value calculation. For example, $\Delta RSSI_{IGM}$=RSSI (IGM+4, QGM)−RSSI (IGM, QGM); $\Delta RSSI_{QGM}$=RSSI (IGM, QGM+4)−RSSI (IGM, QGM). A difference between $|\Delta RSSI_{IGM}|$ and $|\Delta RSSI_{QGM}|$ determines a subsequent moving direction from the current location. When it is determined in step 134 that $|\Delta RSSI_{IGM}|$ is greater, it implies that the optimal location can be more quickly found if the amplification ratio control signal IGM is first changed. Conversely, when it is determined in step 134 that $|\Delta RSSI_{IGM}|$ is smaller, it implies that optimal location can be more quickly found if the amplification ratio control signal QGM is first changed. In FIG. 8, processes following step 134 at the left and right sides are substantially the same, with only a sequence of change priorities of the amplification ratio control signal IGM and the amplification ratio control signal QGM being the opposite. In the description below, details of subsequent steps when a determination result of step 134 is affirmative are given. Details of subsequent steps when the determination result of step 134 is negative can be easily deduced, and shall be omitted herein.

In step 136I, the step-size variable StepSize is set to 8. In step S138I, the current location is changed along the horizontal axis (IGM) in FIG. 5 using a step size of 8 to update the most appropriate amplification ratio control signal $IGM_{best}$ and the optimal output result $RSSI_{best}$. Similarly, in step 140I, the current location is changed along the vertical axis (QGM) in FIG. 5 using a step size of 8 to update the most appropriate amplification ratio control signal $IGM_{best}$ and the optimal output result $RSSI_{best}$.

For example, assume that the determination result of step 134 in FIG. 8 is affirmative, and the current location and the optimal location are both (32, 32) in the first quadrant. In step 138I, the location is changed from (32, 32) towards the left or the right utilizing a step-size of 8 to search for a location that generates the minimum RSSI in the first quadrant. In step 138I, it is possible that eight locations (0, 32), (8, 32), (16, 32) . . . (56, 32) have been searched. Assuming that among the eight locations (0, 32), (8, 32), (16, 32) . . . (56, 32), the location that generates the minimum RSSI is (8, 32). In step 138I, the most appropriate amplification ratio control signal $IGM_{best}$ is updated to 8, and so the optimal location is (8, 32), and the optimal output result $RSSI_{best}$ is currently RSSI (8, 32). Similarly, in step 140I, the location is changed from (8, 32) upwards or downwards utilizing a step-size of 8 to search for a location that generates the minimum RSSI in the first quadrant. Assuming that among the eight positions (8, 0), (8, 8), (8, 16) . . . (8, 56), the location that generates the minimum RSSI is (8, 16). In step 140I, the most appropriate amplification ratio control signal $QGM_{best}$ is updated to 16, so that the optimal location is currently (8, 16), and the optimal output result $RSSI_{best}$ is currently RSSI (8, 16). From the above examples, it is concluded that the optimal location can be identified by searching through a maximum of 16 locations in steps 138I and 140I. Assuming that positive and negative values of the gradients of the RSSI are utilized for assisting in determining the search direction of the current location, it is probable the optimal location can be found by searching through a smaller number of locations in steps 138I and 140I.

In step 142I, the step-size variable StepSize is set to a smallest value of 1. In step 144I, the current location is changed along the horizontal axis (IGM) in FIG. 5 utilizing a step-size of 1 to update the most appropriate amplification ratio control signal $IGM_{best}$ and the optimal output result $RSSI_{best}$. Similarly, in step 146I, the current location is changed along the vertical axis (QGM) in FIG. 5 utilizing a step-size of 1 to update the most appropriate amplification ratio control signal $QGM_{best}$ and the optimal output result $RSSI_{best}$. Step 148I, following step 146I, performs the same operations as those in step 144I.

Assuming that after step 140I in FIG. 8, the current location and the optimal location are updated to (8, 16), and the optimal output result $RSSI_{best}$ is updated to RSSI (8, 16). Similar to step 136I, in step 144I, an optimal location that generates the minimum RSSI is searched for among 15 locations (1, 16), (2, 16) . . . (8, 16) . . . (15, 16) to fine-tune the optimal location. Assume that the optimal location that generates the minimum RSSI among the 15 locations is (10, 16). In step 144I, the most appropriate amplification ratio control signal $IGM_{best}$ is updated to 10. The optimal location is currently (10, 16), and the optimal output result $RSSI_{best}$ is currently RSSI (10, 16). Similarly, in step 146I, an optimal location that generates the minimum RSSI is searched for among 15 locations (10, 9), (10, 10) . . . (10, 16) . . . (10, 23). Assume that the optimal location identified in 146I is (10, 20). Similar to step 146I, in step 148I, only the amplification ratio control signal IGM is changed to find the optimal location. For example, step 148I fine-tunes the most appropriate amplification ratio control signal $IGM_{best}$ to 13. Thus, the optimal location is finally (13, 16), and the optimal output result $RSSI_{best}$ is RSSI (13, 16).

Figure 9:
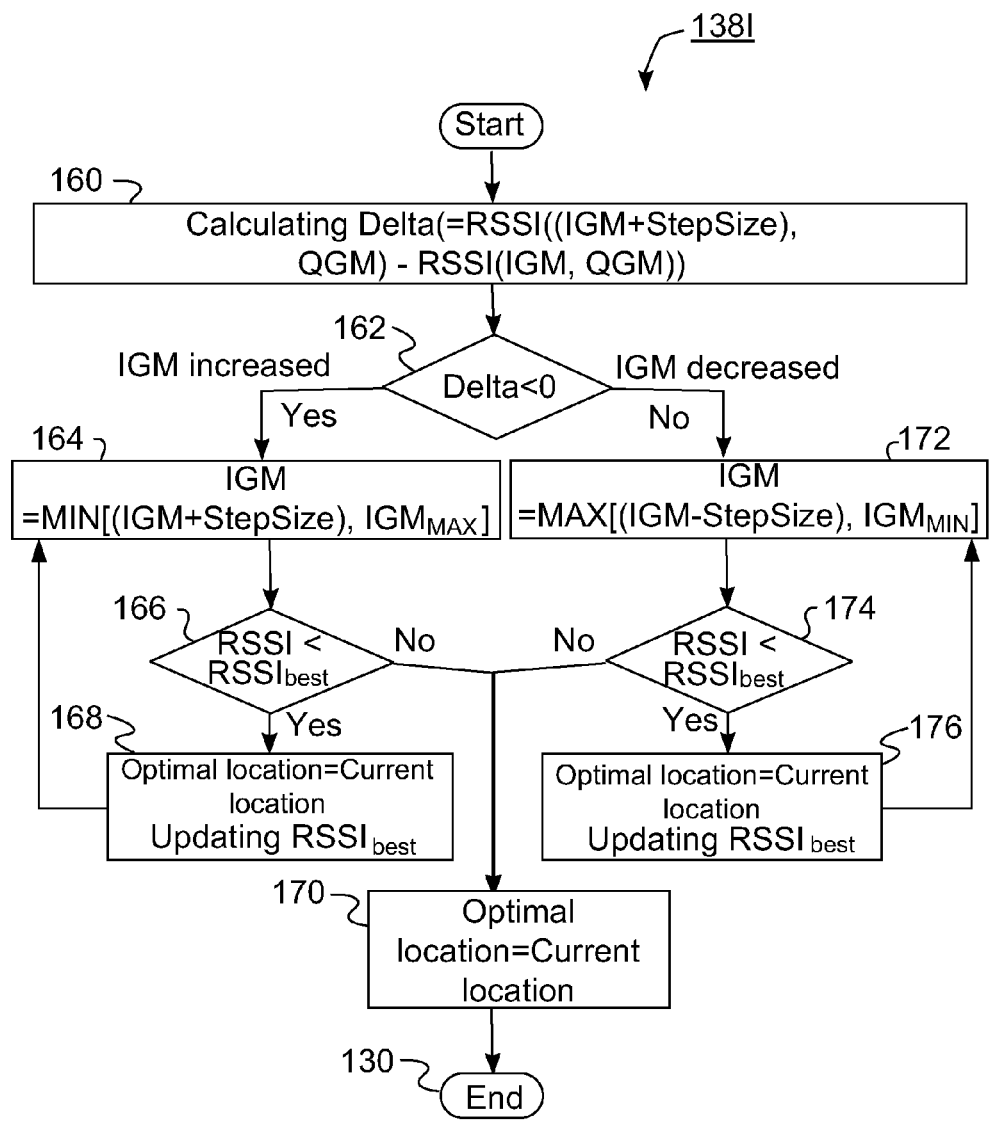
FIG. 9 is an example of 138I of FIG. 8.

FIG. 9 shows an example of details of step 138I. Based on the descriptions associated with step 138I, steps 140I, 144I, 146I, 148I, 138Q, 140Q, 144Q, 146Q and 148Q are be similarly deduced, and shall be omitted herein. When entering step 138I, the current location and the optimal location are the same. In step 160, a change Delta (=RSSI (IGM+StepSize, QGM)−RSSI (IGM, QGM)) is calculated. In step 162, it is determined whether the change Delta is a positive or negative value. When the change is a negative value, i.e., when a determination result of step 162 is affirmative, it means that a smaller RSSI can be expected by increasing the amplification ratio control signal IGM. In step 164, given that the amplification ratio control signal IGM does not exceed the maximum value $IGM_{MAX}$ of the search range in step 138I, StepSize for the amplification ratio control signal IGM is increased. In step 166, it is checked whether the current output result generated by the current location is still smaller than the optimal output result $RSSI_{best}$. When the current output result is smaller, i.e., when a determination result of step 166 is affirmative, the optimal output result $RSSI_{best}$ is updated to the current output result and the optimal location is updated to the current location in step 168. When the current output result is not smaller, i.e., when the determination result of step 166 is negative, it means that the output result RSSI will not be decreased if the amplification ratio control signal is further increased, and so the optimal output result $RSSI_{best}$ is almost certain. Therefore, in continuation of the negative determination result of step 166, the current location is restored back to the optimal location in step 170. When the change Delta in step 162 is a positive value, it means that a smaller RSSI can be obtained if the amplification ratio control signal IGM is decreased. In step 172, given that the amplification ratio control signal IGM is not decreased to being lower than a minimum value $IGM_{MIN}$ of the search range in step 138I, StepSize of the amplification ratio control signal IGM is decreased. In step 174, it is checked whether the current output result generated by the current location is smaller than the optimal output result $RSSI_{best}$. In step 176, the optimal output result $RSSI_{best}$ is updated to the current output result, and the optimal location is updated to the current location. A negative determination result of step 174 means that a valley value has been reached, and so the process continues to step 170.

According to the descriptions, in one embodiment of the present invention, the step of searching for the optimal location first determines a possible sub-space where the optimal location is located, the optimal location is identified in the sub-space utilizing a larger step-size, and the optimal location is further fine-tuned utilizing a smaller step-size. Further, in an alternative embodiment of the present invention, the process of finding the optimal location begins first along the direction of change of the largest gradient and then along the direction of change of a smaller gradient. When the conventional exhaustive search process is employed for finding the optimal location in the variable space in FIG. 5, 127*127 locations need to be searched, resulting in a lengthy computation time and consuming immense amounts of computations and resources. With the search method according to the above embodiments of the present invention, the optimal location can be determined by searching through a smaller number of locations. As the computation amount and time are significantly reduced, the search method according to the embodiments is particularly suitable to a communication system. In an alternative embodiment of the present invention, a specific target location can be determined to render the output result to satisfy a specific value, e.g., to render the output value to be larger than a target value or to be smaller than a target value.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A search method for finding a target location in a variable space;
the variable space being constructed by a set of variables and having a plurality of sub-spaces, the target location rendering an output result of a wireless communication to satisfy a target value; the search method comprising:
providing the set of variables;
identifying a target sub-space where the target location is located from the sub-spaces;
obtaining a plurality of gradients of the output result at a predetermined location from the target sub-space, each of the gradients corresponding to a direction of change; and
selecting one from the directions of change according to the gradients, and changing values of the set of variables along the selected direction of change to find the target location,
wherein the step of selecting one from the directions of change according to the gradients, and changing the values of the set of variables along the selected direction of change to find the target location first changes the values of the set of variables utilizing a first step-size to find the target location, and then changes the values of the set of variables utilizing a second step-size to find the target location; the first step-size is greater than the second step-size.

2. The search method according to claim 1, wherein the output result is a signal power of a signal, and the target location minimizes the signal power.

3. The search method according to claim 1, wherein the step of identifying the target sub-space where the target location is located from the sub-spaces comprises:
obtaining a plurality of output results at a plurality of predetermined locations in the sub-spaces, respectively; and
determining the target sub-space according to the output results.

4. The search method according to claim 1, wherein the step of selecting one from the directions of change according to the gradients, and changing the values of the set of variables along the selected direction of change to find the target location comprises:
changing the values of the set of variables according to the direction of change corresponding to a maximum gradient of the gradients to find the target location.

5. The search method according to claim 1, wherein the step of selecting one from the directions of change according to the gradients, and changing the values of the set of variables along the selected direction of change to find the target location comprises:

changing the values of the set of variables according to the direction of change corresponding to a maximum gradient of the gradients to find the target location; and changing the values of the set of variables according to the direction of change corresponding to a smaller gradient of the gradients to find the target location.

6. The search method according to claim 1, wherein the step of selecting one from the directions of change according to the gradients, and changing the values of the set of variables along the selected direction of change to find the target location sequentially comprises:

changing the values of the set of variables according to the direction of change corresponding to a maximum gradient of the gradients utilizing a first step-size to find the target location;

changing the values of the set of variables according to the direction of change corresponding to a smaller gradient of the gradients utilizing a second step-size to find the target location;

changing the values of the set of variables according to the direction of change corresponding to the maximum gradient of the gradients utilizing a third step-size to find the target location; and changing the values of the set of variables according to the direction of change corresponding to the smaller gradient of the gradients utilizing a fourth step-size to find the target location;

wherein, the first step-size is greater than the third step-size, and the second step-size is greater than the fourth step-size.

7. The search method according to claim 6, after the step of changing the values of the set of variables according to the direction of change corresponding to the smaller gradient of the gradients utilizing the fourth step-size to find the target location, further comprising:

changing the values of the set of variables according to the direction of change corresponding to the maximum gradient of the gradients utilizing a fifth step-size to find the target location.

8. The search method according to claim 1, providing two quadrature compensation signals, and wherein the set of variables is for controlling a signal strength of the compensation signals.

9. The search method according to claim 8, wherein the set of variables is for further controlling a polarity of the compensation signals.

10. A search method for finding a target location in a variable space; the variable space being constructed by a set of variables and having a plurality of sub-spaces, the target location rendering an output result of a wireless communication to satisfy a target value; the search method comprising:

providing two quadrature compensation signals;

providing the set of variables for controlling the compensation signals;

feeding the compensation signals to an input of the wireless communication system to change the output result of the wireless communication system;

identifying a target sub-space where the target location is located from the sub-spaces;

obtaining a plurality of gradients of the output result at a predetermined location from the target sub-space, each of the gradients corresponding to a direction of change; and selecting a direction of one from the directions of change according to the gradients, and changing values of the set of variables along the selected direction of change to find the target location, wherein the step of selecting one from the directions of change according to the gradients, and changing the values of the set of variables along the selected direction of change to find the target location first changes the values of the set of variables utilizing a first step-size to find the target location, and then changes the values of the set of variables utilizing a second step-size to find the target location; wherein, the first step-size is greater than the second step-size.

11. The search method according to claim 10, wherein the output result is a signal power of a signal, and the target location minimizes the signal power.

12. The search method according to claim 10, wherein the step of identifying the target sub-space where the target location is located from the sub-spaces comprises:

obtaining a plurality of output results at a plurality of predetermined locations in the sub-spaces, respectively; and determining the target sub-space according to the output results.

13. The search method according to claim 10, wherein the step of selecting one from the directions of change according to the gradients, and changing the values of the set of variables along the selected direction of change to find the target location comprises:

changing the values of the set of variables according to the direction of change corresponding to a maximum gradient of the gradients to find the target location.

14. The search method according to claim 10, wherein the step of selecting one from the directions of change according to the gradients, and changing the values of the set of variables along the selected direction of change to find the target location comprises:

changing the values of the set of variables according to the direction of change corresponding to a maximum gradient of the gradients to find the target location; and changing the values of the set of variables according to the direction of change corresponding to a smaller gradient of the gradients to find the target location.

15. The search method according to claim 10, wherein the step of selecting one from the directions of change according to the gradients, and changing the values of the set of variables along the selected direction of change to find the target location sequentially comprises:

changing the values of the set of variables according to the direction of change corresponding to a maximum gradient of the gradients utilizing a first step-size to find the target location;

changing the values of the set of variables according to the direction of change corresponding to a smaller gradient of the gradients utilizing a second step-size to find the target location;

changing the values of the set of variables according to the direction of change corresponding to the maximum gradient of the gradients utilizing a third step-size to find the target location; and changing the values of the set of variables according to the direction of change corresponding to the smaller gradient of the gradients utilizing a fourth step-size to find the target location;

wherein, the first step-size is greater than the third step-size, and the second step-size is greater than the fourth step-size.

16. The search method according to claim 15, after the step of changing the values of the set of variables according to the direction of change corresponding to the smaller gradient of the gradients utilizing the fourth step-size to find the target location, further comprising:

changing the values of the set of variables according to the direction of change corresponding to the maximum gradient of the gradients utilizing a fifth step-size to find the target location.

17. The search method according to claim 10, wherein in the step of providing the set of variables for controlling the compensation signals, the set of variables is for controlling a signal strength of the compensation signals.

18. The search method according to claim 10, wherein in the step of providing the set of variables for controlling the compensation signals, the set of variables is for controlling a polarity of the compensation signals.

19. A search method for finding a target location in a variable space; the variable space being constructed by a set of variables and having a plurality of sub-spaces, the target location rendering an output result of a wireless communication to satisfy a target value; the search method comprising:

providing the set of variables;

identifying a target sub-space where the target location is located from the sub-spaces;

obtaining a plurality of gradients of the output result at a predetermined location from the target sub-space, each of the gradients corresponding to a direction of change; and selecting one from the directions of change according to the gradients, and changing values of the set of variables along the selected direction of change to find the target location, wherein the step of selecting one from the directions of change according to the gradients, and changing the values of the set of variables along the selected direction of change to find the target location sequentially comprises:

changing the values of the set of variables according to the direction of change corresponding to a maximum gradient of the gradients utilizing a first step-size to find the target location;

changing the values of the set of variables according to the direction of change corresponding to a smaller gradient of the gradients utilizing a second step-size to find the target location;

changing the values of the set of variables according to the direction of change corresponding to the maximum gradient of the gradients utilizing a third step-size to find the target location; and changing the values of the set of variables according to the direction of change corresponding to the smaller gradient of the gradients utilizing a fourth step-size to find the target location;

wherein, the first step-size is greater than the third step-size, and the second step-size is greater than the fourth step-size.

* * * * *